US008730796B2

(12) United States Patent
Samuel et al.

(10) Patent No.: US 8,730,796 B2
(45) Date of Patent: May 20, 2014

(54) PROVIDING RADIO ACCESS BETWEEN CELLULAR AND INTERNET PROTOCOL-BASED WIRELESS COMMUNICATION NETWORKS

(75) Inventors: Louis Gwyn Samuel, Swindon (GB); Malek Shahid, Chippenham (GB); Markus Georg Bauer, Pegnitz (DE); Gerhard Helmut Hertlein, Hoechstadt (DE)

(73) Assignee: Alcatel Lucent, Paris (FR)

( * ) Notice: Subject to any disclaimer, the term of this patent is extended or adjusted under 35 U.S.C. 154(b) by 2048 days.

(21) Appl. No.: 11/241,843

(22) Filed: Sep. 30, 2005

(65) Prior Publication Data
US 2007/0076608 A1 Apr. 5, 2007

(51) Int. Cl.
*H04J 3/14* (2006.01)

(52) U.S. Cl.
USPC ............................................ 370/230; 370/252

(58) Field of Classification Search
USPC .................. 370/338, 328, 310, 351, 355, 356
See application file for complete search history.

(56) References Cited

U.S. PATENT DOCUMENTS

| | | | |
|---|---|---|---|
| 7,408,906 B2 * | 8/2008 | Griswold et al. ............. | 370/338 |
| 2002/0191635 A1 * | 12/2002 | Chow et al. .................... | 370/463 |
| 2002/0193116 A1 * | 12/2002 | Agrawal et al. ............... | 455/445 |
| 2003/0069018 A1 * | 4/2003 | Matta et al. .................... | 455/436 |
| 2005/0021586 A1 * | 1/2005 | Bichot et al. ................... | 709/200 |
| 2006/0209768 A1 * | 9/2006 | Yan et al. ....................... | 370/338 |

OTHER PUBLICATIONS

Comer, Internetworking with TCP/IP p. 105 sections 10.4.1, 1998 Prentise Hal.*

"The Mobile Network: Empowering the User, Building the Business" Ericsson Jun. 2000.
L. Morand, et al. "Global mobility approach with Mobile IP in "All IP" networks" IEEE, 2002.
Muhammad Jaseemuddin "An Architecture for Integrating UMTS and 802.11 WLAN Networks" ISCC, 2003.
"Tutorial: Interworking Switched Circuit and Voice-over-IP Networks" 2001, Performance Technologies, Inc.
Ivan Armuelles Voinov, et al. "Profile System for Management of Mobility Context Informaiton for Access Network Selection and Transport Service Provision in 4G Networks" WWIC, 2005.
M. Georgiades, et al. "Security of Context Transfer in Future Wireless Communications" Canada NWRF, Toronto Nov. 2004.

* cited by examiner

*Primary Examiner* — Yemane Mesfin
*Assistant Examiner* — Henry Baron
(74) *Attorney, Agent, or Firm* — Davidson Sheehan LLP

(57) ABSTRACT

The present invention provides a method and an apparatus for providing radio access in a communication system by interworking between at least two packet-based networks, such as heterogeneous cellular networks including a cellular network and an Internet Protocol (IP)-based wireless data network. The method includes enabling a packet routing path across the cellular and wireless data networks to provide a quality of service metric and an indication for mobility information associated with a user of a mobile device. The method further comprises transferring the quality of service metric and the indication for mobility information on the packet routing path in response to a service request across the networks. To provide wireless radio access, an IP-based communication system may use a wireless router, such as a base station router (BSR) and an inter-working unit. The inter-working unit may enable a packet routing path to provide a Quality of Service (QoS) metric and an indication for mobility information, such as mobility context information, associated with a user of a mobile device. In this way, instead of using a Mobile-IP client of the mobile device, the inter-working unit may provide radio access to the cellular network and the wireless data network using the wireless router.

22 Claims, 6 Drawing Sheets

PROVIDING RADIO ACCESS BETWEEN CELLULAR AND INTERNET PROTOCOL-BASED WIRELESS COMMUNICATION NETWORKS

FIELD OF THE INVENTION

This invention relates generally to telecommunications, and more particularly, to wireless communications.

DESCRIPTION OF THE RELATED ART

Internet and other packet-based networks provide wireless access to packet-based services on mobile devices. One specification for an Internet Protocol (IP) based wireless access between a communication node, such as an access point and a mobile device over the Internet is outlined in an Internet Engineering Task Force (IETF) standard for "Mobile-IP." Mobile-IP allows users to roam outside their home networks. For example, Mobile-IP supports macro-mobility in IP networks. Mobile-IP uses a home agent (HA) assigned to a mobile device based on the permanent home IP address of the mobile device and a foreign agent (FA) or a proxy device that functions as a FA assigned to the mobile device based on its current location. An IP address also called a care-of address is generally associated with the foreign agent. Packets sent to the mobile device are intercepted by the HA and tunneled to the FA at the care-of address. The FA then decapsulates the packets and forwards the decapsulated packets directly to the mobile device.

By utilizing Mobile-IP, each mobile device is identified by a fixed home address and an associated home agent (HA), regardless of its current point of attachment to the Internet. Packets sent to a mobile device, from a communication node, are directed to the home agent. If the mobile device is away from home, the home agent tunnels packets to a foreign agent (FA) associated with the mobile device. For example, an IP packet comprises payload data and an IP packet header that includes a source address and a destination address. The communication node is set as the IP header source address and the mobile device is set as the IP header destination address.

In a wireless access network, user mobility may be supported locally in a particular domain, such as an administrative domain of the wireless access network. An administrative domain generally uses routers that route and forward intra-domain mobility information within the domain. A domain comprises a division of the wireless access network that includes multiple routers and base stations and a gateway router. Each mobile device may be assigned a home domain based on its permanent IP address. Any other domain besides the home domain is a foreign domain for the mobile device. Using the routers in a domain so that connectivity to the mobile device may be maintained across handoffs, a particular packet routing path through the wireless access network may be setup. By using Mobile-IP, mobility across domains, i.e., inter-domain mobility may be provided. To provide QoS support, a unique, co-located care-of address to the mobile device may be assigned. To maintain end-to-end connectivity as the mobile device user moves, paths to the mobile device may be established. For example, a path may be setup when a mobile device moves from one base station to another within the same domain.

However, when Mobile-IP is used for micro-mobility support, it results in significantly high control overhead due to frequent notifications to the HA. Also, in the case of a Quality of Service (QoS) enabled mobile device, acquiring a new care-of address on every handoff would trigger the establishment of new QoS reservations from the HA to the FA even though most of the path remains unchanged. While Mobile-IP may provide mobility management in a wireless access network, its use across heterogeneous wireless access networks with high mobility users that may require QoS suffers from overhead related inefficiencies.

As architectures of cellular and wireless data systems and associated wireless services evolve, many network operators may have to address providing mobility management with desired QoS. Specifically, three areas of primary concerns include provision of adequate and inexpensive Quality of Service (QoS) dependent services, reduction of system complexity, and reduction in price of ownership of a wireless access network.

One architecture of cellular and wireless data systems, among other things, uses a Base Station Router (BSR) as an architectural component for a wireless access network implementation that permits deployment of a distributed fourth generation (4G)-type architecture in a third generation (3G) environment. The BSR plays a significant role in offering of cellular services that may evolve towards 4G cellular system architecture.

One desired feature of the 4G cellular system architecture is a network-of-network interaction whereby a user may have ubiquitous access to Internet via a variety of wireless access networks (both cellular and wireless data). As is a case in previous wireless generations, this implies a new supporting core architecture. However, having such a proliferation of architectures may inevitably add to an overall system complexity that a network operator may have to adequately address.

Another feature of a network-of-network interaction is that a majority of communications via high-speed data channels may occur in small cells (micro to pico based communications) as smaller cells tend to offer higher efficiency, throughput and capacity of the system. As a result, the overall system complexity may increase. Additionally, the complexity in wireless communications systems, such as cellular systems increases since each newer wireless generation system has to inter-work with the previous wireless generation system(s).

In cellular infrastructure, some significant common denominators in constantly evolving technologies in evolving communications are determined to be Internet Engineering Task Force (IETF)-a body that specifies standard Internet operating protocols, such as TCP/IP and Institute of Electrical and Electronics Engineers (IEEE) based protocols and standards.

The cellular infrastructure situation may further get compounded due to changing nature of data. Specifically, the dominant traffic in evolving wireless systems is expected to be IP data. Some wireless architectures, such as based on Universal Mobile Telecommunications Systems (UMTS) address, in part, the impact in this transition to data but other systems may deliver the wireless data in comparable ways, for example, the wireless architectures that are complaint with the Institute of Electrical and Electronic Engineers (IEEE) 802.11 and 802.16 standards. Both of these architectures, while being adherent to IEEE standards, rely on IP as the mechanism that links the two systems.

Most UMTS and code division multiple access (CDMA) networks do not permit a loose addition of other access technologies that fail to evolve with the Internet, and therefore, backward compatibility of this nature is not addressed by many third generation partnership project (3GPP) standards. However, a wireless architecture may not permit backward compatibility and inter-working between the two architecture types (e.g., a 3GPP standard and an IETF protocol).

One approach in wireless access evolution within UMTS calls for tightly coupling the new air interface within the present UMTS system. This approach could significantly delay the introduction of new and more advantageous technologies. Moreover, a requirement to embed a new technology into an already deployed system increases the cost of technology adoption. Alternatively, a technique that calls for moving QoS or context information from a central point of entry (the GGSN) prevents route optimization for services, such as Voice over IP (VoIP). Besides this lack of route optimization, such a single point of entry may reduce system flexibility, i.e., most system evolution directions set forth above tend to impact the entire core network structure one way or the other.

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

The present invention is directed to overcoming, or at least reducing, the effects of, one or more of the problems set forth above.

In one embodiment of the present invention, a method provides radio access to a cellular network and an Internet Protocol (IP)-based wireless data network in a communication system. The method includes enabling a packet routing path across the cellular and wireless data networks to provide a quality of service metric and an indication for mobility information associated with a user of a mobile device. The method further comprises transferring the quality of service metric and the indication for mobility information on the packet routing path in response to a service request across the networks.

BRIEF DESCRIPTION OF THE DRAWINGS

The invention may be understood by reference to the following description taken in conjunction with the accompanying drawings, in which like reference numerals identify like elements, and in which.

Figure 1:
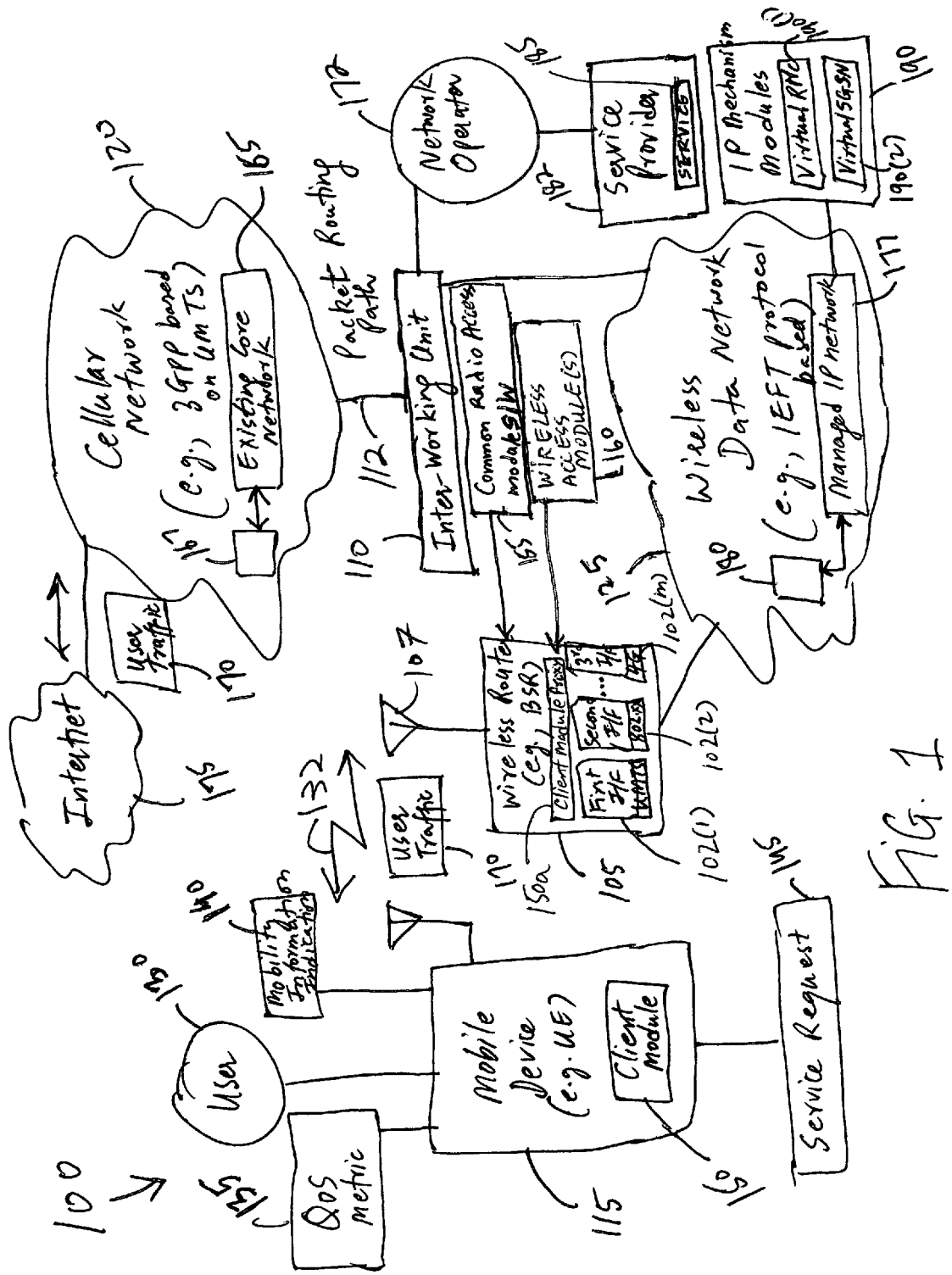
FIG. 1 schematically depicts an Internet Protocol (IP)-based communication system to provide radio access between at least two packet-based networks, such as heterogeneous cellular networks in accordance with one embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions may be made to achieve the developers' specific goals, such as compliance with system-related and business-related constraints, which will vary from one implementation to another. Moreover, it should be appreciated that such a development effort might be complex and time-consuming, but may nevertheless be a routine undertaking for those of ordinary skill in the art having the benefit of this disclosure.

Generally, a method and apparatus inter-works between a cellular network and an Internet Protocol (IP)-based wireless data network for providing radio access in a communication system. The method comprises enabling a packet routing path across said cellular and wireless data networks to provide a quality of service metric and an indication for mobility information associated with a user of a mobile device. The method further comprises transferring said quality of service metric and said indication for mobility information on said packet routing path, in response to a service request from said user. For example, an inter-working unit between a standards compliant 3GPP cellular system and a cellular system based on IEFT protocols may enable a packet routing path for QoS and mobility context information transfer between the two systems. By employing a network active set formed from a first base station that operates as a primary agent and a second base station that operates as a secondary agent, a Base Station Router (BSR)-based architecture of a wireless communications system may provide a radio access across at least two different domain-based packet networks. That is, a BSR-based architecture may enable mobility within an IP-based communication system, such as an IEFT-based architecture. A packet routing path enables backward compatibility in terms of handling QoS and mobility information. Using the packet routing path, such a BSR-based architecture may permit backward compatibility and inter-working between the two architecture types (e.g., a 3GPP standard and an IETF protocol). Accordingly, a communication system architecture may provide a wireless radio access across the two architecture types. To provide an IP-based radio access in a next generation network, the method and apparatus of the present invention may utilize one or more Internet Protocol (IP) mechanisms. For example, in next generation networks, a wireless router, such as a Base Station Router (BSR) may provide wireless radio access using one or more IP mechanisms. A common radio access software may comprise a wireless access module that provides inter-working between a cellular and wireless data networks. One or more metrics used for enabling a radio access may be a user Quality of Service (QoS) metric. Another metric may be mobility context information of a user with service metrics from different wireless and/or wireline or network links in a converged administrative IP domain. Information associated with these metrics may then be managed by the IP-based mechanisms. Accordingly, the common radio access software may treat any wireless radio link as "one more IP hop." In this manner, a wireless router may perform radio access management of the Internet Protocol based resources in a next generation network. By enabling connections over a multiplicity of air or wireless interfaces at the wireless router, a desired Quality of Service (QoS) may be provided to a particular user during a specific service on packet-based cellular communications at a wireless communication device of an evolving mobile system.

Referring to FIG. 1, an Internet Protocol (IP)-based communication system 100 is illustrated to provide radio access between at least two packet-based networks, such as heterogeneous cellular networks in accordance with one embodiment of the present invention. To provide wireless radio access, the IP-based communication system 100 may use a wireless router 105, such as a Base Station Router (BSR) and an inter-working unit 110 that enables a mobile device 115 to access a cellular network 120 across a wireless data network 125 and vice versa. In one embodiment, the cellular network 120 may be, at least in part, based on a Universal Mobile Telecommunications System (UMTS) standard. The cellular network 120 may be related to any one of the 2G, 3G, or 4G standards and employ any one of the protocols including the UMTS, CDMA200, GSM, Bluetooth or the like. However, use of a particular standard or a specific protocol is a matter of design choice and not necessarily material to the present invention. Likewise, the wireless data network 125 may be, at least in part, based on at least one of an Internet Engineering Task Force (IETF) protocol and an Institute of Electrical and Electronic Engineers (IEEE) standard.

To provide radio or wireless access to and from the IP-based communication system 100, the wireless router 105 may forward the transmitted packets between the wireless data network 125 and the cellular network 120. That is, the wireless router 105 may be a device capable of connecting at least two packet-based access networks. By connecting such packet-based access networks, the wireless router 105 may control the routing of packets from a source to a destination and may provide alternate paths when necessary. In one embodiment, the wireless router 105 as a BSR may enable a wireless radio access via different radio access architectures.

For the purposes of providing radio or wireless access across the IP-based communication system 100, the inter-working unit 110 may enable inter-working between at least two packet-based access networks, e.g., the cellular and wireless data networks 120, 125. By inter-working between the cellular and wireless data networks 120, 125, the inter-working unit 110 may enable either an extension of an existing packet-based access network or an integration of a new packet-based access network without impacting on overall system architecture and protocols in the IP-based communication system 100.

In one embodiment, the inter-working unit 110 may enable a packet routing path 112 for providing an IP-based radio or wireless access at a desired level of service to one or more packet-based services on the mobile device 115. The packet routing path 112 may provide a Quality of Service (QoS) metric 135 and an indication 140 for mobility information associated with the user 130 of the mobile device 115. For the user 130 of the mobile device 115, while the QoS metric 135 may indicate Internet Protocol-based Quality of Service (QoS) criteria associated with a specific service, the indication 140 for mobility information may indicate mobility context information that allows a consistent and ubiquitous provision of a service to the user 130. The indication 140 for the mobility context information may indicate the context information for a communication session.

The mobile device 115 may comprise a client module 150 that provides a mobile-IP support on the mobile device 115. The client module 150 may enable transition between the cellular network 120 and the wireless data network 125. Instead of using the client module 150 on the mobile device 115, in an alternate embodiment, the inter-working unit 110 may provide radio access to the cellular network 120 and the wireless data network 125 using a client module proxy 150a at the wireless router 105. That is, the wireless router 105 may function as a proxy for both the QoS metric 135 and the indication 140 of the mobility information 140. In this way, the IP-based communication system 100 may provide the QoS metric 135 and the indication 140 of the mobility information 140 across various wireless access architectures even when the mobile device 115 may not process or obtain the QoS metric 135 and the indication 140 of the mobility information 140.

For example, the mobility context information to an IP packet flow during the communication session associated with a handoff may include, but is not limited to security context, policy, congestion indication/management, header compression and accounting. Likewise, the QoS metric 135 may be related to an end-to-end QoS user-service on a network layer. For the user 130 of the service, the QoS metric 135 may be used for routing of a packet over the packet routing path 112. One example of the QoS metric 135 for the packet routing path 112 is bandwidth. Other examples of the QoS metric 135 include throughput, delay or bit rate. A value or information may be associated with the packet routing path 112 for the QoS metric 135. Such value or information of the QoS metric 135 may characterize the respective link for route discovery of the plurality of packets. The value or information of the QoS metric 135 may be distributed to all routers including the wireless router 105 and one or more IP routers in one embodiment.

For measuring the QoS metric 135, any number of suitable measurement methodologies may be used. A direct measurement, or a projection or an estimation of metric value may be obtained. Based on the direct measurement, a user-service metric value may be obtained using injected test traffic. For example, a measurement of a round-trip delay of an IP packet of a given size over a given route at a given time may indicate a value of the QoS metric 135.

In some embodiments, use of one or more user-and-service specific metrics, such as the QoS metric 135 and the indication 140 for the mobility context information may provide radio access to converged networks. For providing such wireless radio access, the packet routing path 112 becomes an IP hop, enabling use of existing IP mechanisms. In other words, a radio or wireless access may be enabled with the wireless router 105 that connect to the user 130 via a corresponding wireless link 132.

Using the wireless router 105 and the inter-working unit 110, the IP-based communication system 100 may provide radio access across or between at least two packet-based access networks, such as the cellular network 120 and the wireless data network 125 across the packet routing path 112.

One example of the packet-based access network is a next generation network (NGN). In the NGN, service-related functions may be independent from underlying transport infrastructure. The NGN may offer an unrestricted access by users to different service providers. The NGN may support generalized mobility that allows a consistent and ubiquitous provision of services to users. In a next generation network, radio access may be based on one or more user-service-specific metrics, employing IP-based mechanisms.

In operation, over the packet routing path 112, the IP-based communication system 100 may route packets of information for a user 130 of the mobile device 115. That is, as the user 130 moves between the cellular network 120 and the wireless data network 125, the inter-working unit 110 may cause the mobile device 115 to transition between networks. The routing of packets may occur at a network layer based on any one or more of desired network or communication protocols, as will be appreciated in one skilled in the pertinent art.

In response to a service request 145 from the user 130, the inter-working unit 110 may transfer the QoS metric 135 and the indication 140 for mobility information on the packet routing path 112. However, this transition between the cellular network 120 and the wireless data network 125 may be accomplished without using a client even though the mobile device 115 may comprise the client module 150 that provides a mobile-IP support on the mobile device 115. Instead of using the client module 150, the inter-working unit 110 may provide radio access to the cellular network 120 and the wireless data network 125 using the wireless router 105.

In the IP-based communication system 100, the wireless router 105 may comprise a common radio access software 155 (S/F) that may further comprise a wireless access module 160 to provide inter-working between the cellular and wireless data networks, 120 and 125. Additionally, for the cellular network 120, an existing core network 165 may be deployed to handle data traffic 167. An example of the data traffic 167 includes circuit switched user plane traffic. While the user traffic 170 on the internet 175 for a network operator 172 may be received at the existing core network 165, the user traffic 170 from the mobile device 115 may be received at the wireless router 105.

Likewise, for the wireless data network 125, a managed IP network 177 may be deployed to handle voice traffic 180, e.g., voice over IP (VoIP). The wireless router 105, e.g., a Base Station Router (BSR) may manage the IP-based communications in the managed IP network 177. Authentication of the mobile device 115 may be enabled within the managed IP network 177. By using the inter-working unit 110 and the wireless router 105, a service provider 182 may provide a service 185 to the user 130 of the mobile device 115 within the IP-based communication system 100 across the cellular network 120 and the wireless data network 125, in some embodiments of the present invention.

As one example, the IP-based communications in the IP-based communication system 100 may comprise packets of information that may carry real-time multimedia streams of data, voice, and video across a wireless network portion and/or a fixed, wired network portion thereof. In one embodiment, the wireless router 105 may cause packet forwarding in real-time multimedia streams of the IP-based communications. To enable wireless and wired IP-based communications, over a wireless network and/or a fixed, wired network portions, the wireless router 105 may include a plurality of integrated communication interface(s) (I/Fs) 102(1-m).

More specifically, the wireless router 105 may comprise one or more access or air or communication interface(s) (I/Fs) 102(1-m) including wireless interfaces and/or wireline interfaces based on a host of mobile communication standards, e.g., the UMTS, IEEE 802.xx, and 4G standards. For supporting different types of IP-based communications or wireless links with the mobile device 115, the wireless router 105 may comprise first, second, third interfaces (I/Fs) 102(1-m). For example, while the first I/F 102(1) may provide a first IP-based communication based on the UMTS standard, the second I/F 102(2) may provide a second IP-based communication based on the IEEE802.11 standard. Additionally, the wireless router 105 may further comprise a third I/F 102(3), which may enable a third IP-based communication based on the 4G standard with the mobile device 115 for the user 130 thereof. An example of the first, second, and third IP-based communications or wireless links includes a wireless IP-Hop.

By using the first, second, and third interfaces 102(1-3), the wireless router 105 may enable an Internet Protocol based access to a converged administrative domain of at least two packet-based access networks, such as the cellular network 120 and the wireless data network 125. The wireless router 105 may use one or more Internet Protocol based mechanisms on a network layer of a protocol stack. The routing of packets may occur through the packet routing path 112 based on one or more protocols at the network layer, which is responsible for addressing and delivery of packets across the cellular network 120 and the wireless data network 125 in a wireless-enabled Internet. The network layer may be the third layer or Layer 3 of an Open Systems Interconnection (OSI) model which maintains network protocol addresses (as compared to media access control (MAC) addresses) for transmitting messages to selected destinations.

In one embodiment, the wireless router 105 may be a device capable of connecting a wireless local area network (WLAN) to a LAN and/or a virtual LAN. The wireless router 105 may control the routing of packets from a source to a destination and may provide alternate paths when necessary. The wireless router 105 may read network layer addresses of the transmitted packets; and only forward packets of information those addressed from one wireless network to another wired or fixed network. For example, the wireless router 105 may be a base station in accordance with one embodiment of the present invention. The wireless router 105 may comprise a Base Station Router (BSR) card. The wireless router 105 may be a fixed transmission and reception station for handling mobile traffic in the IP-based communication system 100. To provide a wireless service, the wireless router 105 may comprise at least one antenna 107 that transmits and receives information from a plurality of mobile or wireless communication devices including the mobile devices 115, e.g., a cellular phone, in a cell of the IP-based communication system 100. While the cell may be divided into multiple sectors, the antenna 107 may serve one or more of the sectors in the cell. In addition to the at least one antenna 107, the wireless router 105 may include base transceiver (BTS) circuitry. Consistent with one embodiment, the wireless router 105 may interface with a conventional radio network controller (RNC) coupled to a packet data serving node that includes a foreign agent (FA) or a Mobile-IP proxy function at the client module proxy 150a.

To provide a desired wireless radio access, one or more IP-based mechanism modules 190 may be associated with the managed IP network 177 for the wireless router 105. Using the IP-based mechanism modules 190, the wireless router 105 may enable a radio access based on the QoS metric 135 and the indication 145 for mobility context information. In one embodiment, the IP-based mechanism modules 190 may comprise a virtual radio network controller (RNC) 190(1) and a virtual serving General Packet Radio Service (GPRC) node (SGSN) 190(2).

Using the IP-based mechanism modules 190, the wireless router 145 may enable the existing core network 165 to recognize the managed IP network 177 as the virtual RNC 190 (1) for traffic associated with session management in an IP-based wireless radio access communication. Likewise, the wireless router 105 may enable the existing core network 165 to recognize the managed IP network 177 as the virtual serving GPRS support node (SGSN) for traffic associated with a GRPS tunneling protocol of control.

For an IP-based wireless radio access, the wireless router 105 may enable the managed IP network 177 to move at least one of an originating and a terminating circuit switched calls back to the existing core network 165. While circuit switched user plane traffic may be handled within the existing core network 165, voice traffic may be handled in the managed IP network 177 as Voice over IP (VoIP). Essentially, the packet routing path 112 provides a link for a GPRS tunneling protocol for the user 130 between the managed IP network 177 and the existing core network 165. Using the wireless router 105 and the inter-working unit 110, the IP-based communication system 100 may enable data traffic between the cellular and wireless data networks, 120 and 125, over the packet routing path 112 for the mobile device 115.

In one embodiment, the cellular and wireless data networks 120, 125 may be heterogeneous cellular networks. The wireless router 105 may comprise a common radio access module software (S/W) 155 and one or more wireless access module(s) 160 to provide radio access across heterogeneous cellular that are capable of providing wireless communications over the IP-based communication system 100 and IP-based cellular networks, such as the wireless data network 125. The common radio access module S/W 155 includes a portion common to the cellular and wireless data networks 120, 125. By deploying the wireless access module(s) 160 and the common radio access module S/W 155 in the wireless router 105 for use by the network operator 172 that operates the networks 120, 125, the IP-based communication system 100.

Consistent one embodiment, the user traffic 170 may be received at a router deployed at a border of the existing core network 165 associated with the cellular network 120. One example of the router may be an internet protocol (IP)-based router capable of routing packets of the user traffic 170, which may include data, voice, media content, and the alike.

According to one embodiment, using the packet routing path 112 between the cellular network 120 and the wireless data network 125, the inter-working unit 110 may carry the user traffic 170 associated with the service request 145 across the IP-based communication system 100. By setting up the packet routing path 112 between the cellular network 120 and the wireless data network 125, radio access may be integrated for the user 130 of the mobile device 115 to service the service request 145 across the cellular and wireless data networks 125, 125. In this way, a service area of the cellular network 120 may be extended through the wireless data network 125 when providing radio access for the network operator 172 within the IP-base communication system 100.

For providing wireless radio access to a service, the wireless router 105 may comprise a plurality of interfaces (I/F) 102(1-m). The wireless router 105 may route packets over wireless and/or wireline networks in accordance with one embodiment of the present invention. To route packets over wireless and/or wireline networks, the wireless router 105 may use the common radio access software (S/F) 155 that includes a system manager, a session manager, and a resource manager. The wireless router 105 may further include an IP routing table and a network IP layer for the wireless access modules(s) 160. A corresponding wireless access module may be associated to each respective interface 102.

The wireless access module(s) 160 may be capable of evaluating metrics from parameters of a receiver (RX) and a transmitter (TX). Consistent with one embodiment of the present invention, the wireless access module 160 may comprise a metrics evaluator and a scheduler coupled to the transmitter. The RX parameters and the TX parameters may be obtained at the receiver and the transmitter, respectively for the metrics evaluator to process the metrics for the IP-based mechanisms. In some embodiments, the IP-based mechanisms may include, but are not limited to, packet-based transfer, separation of control functions among bearer capabilities, call/session, and application/service, and decoupling of service provision from network. Additionally, provision of open interfaces, support for a wide range of services, applications and mechanisms based on service building blocks (including real time/streaming/non-real time services and multi-media), broadband capabilities with end-to-end QoS and transparency, inter-working with legacy networks via open interfaces, generalized mobility, and unrestricted access by users to different service providers.

According to one illustrative embodiment of the present invention, for a packet-based access network, the wireless router 105 may provide a converged network communication environment within the Internet Protocol (IP)-based communication system 100. To provide the converged network communication environment, the Internet Protocol (IP)-based communication system 100 may use a backhaul network including an IP-based radio access network (RAN).

Figure 2:
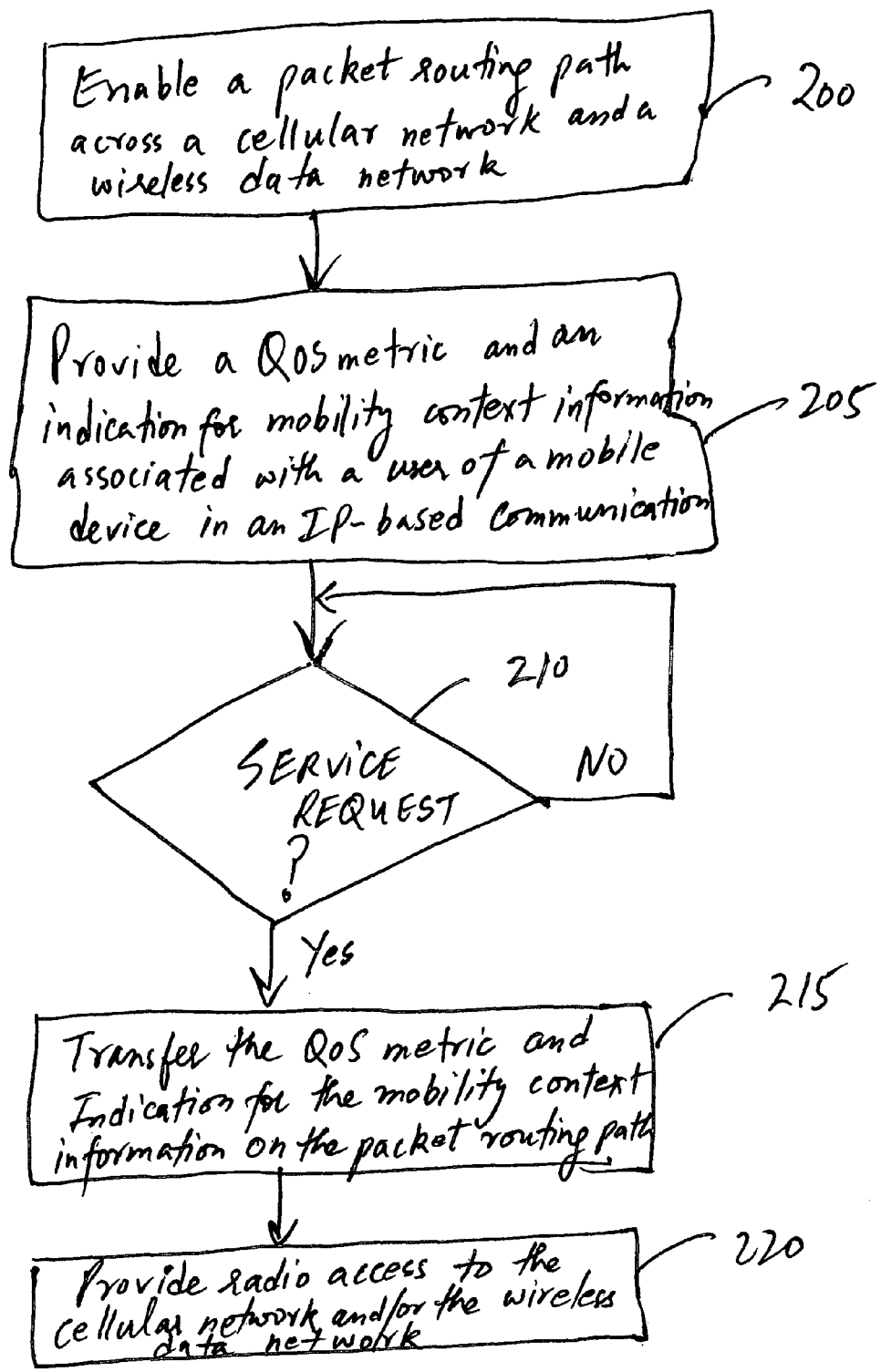
FIG. 2 schematically depicts a method for providing radio access to the cellular network and the wireless data network in the IP-based communication system illustrated in FIG. 1 in accordance with one embodiment of the present invention.

Referring to FIG. 2, a method for providing radio access to the cellular network 120 and the wireless data network 125 in the IP-based communication system 100 is illustrated in accordance with one embodiment of the present invention. At block 200, the packet routing path 112 may be enabled between the cellular network 120 and the wireless data network 125. The packet routing path 112 may provide the QoS metric 135 and the indication 140 for mobility context information associated with the user 130 of the mobile device 115 in an IP-based communication, as shown in block 205.

At a decision block 210, a check determines whether the service request 145 is invoked. If the service request 145 is initiated to detected, at block 215, the QoS metric 135 and the indication 140 for the mobility context information may be transferred on the packet routing path 112 between the cellular network 120 and the wireless data network 125. In this way, using the inter-working unit 110, the IP-based communication system 100 illustrated in FIG. 1 may provide radio access to the cellular network 120 and/or the wireless data network 125, as indicated at block 220 based on the wireless router 105, such as the Base Station Router (BSR). However, persons skilled in the art would recognize that although the inter-working unit 110 and the wireless router 105 is shown to provide the radio access across to heterogeneous cellular networks, such as the cellular network 120 and the wireless data network 125, another suitable architecture, which provides wireless access to the user 130 of the mobile device without using a mobile-IP support may be deployed. For example, a communication node that provides an access point for IEEE 802.11 to an IP core network that includes only standard IP routing elements or other components may be used to enable wireless radio access for the mobile device 115 across heterogeneous communication networks including disparate cellular networks.

Figure 3:
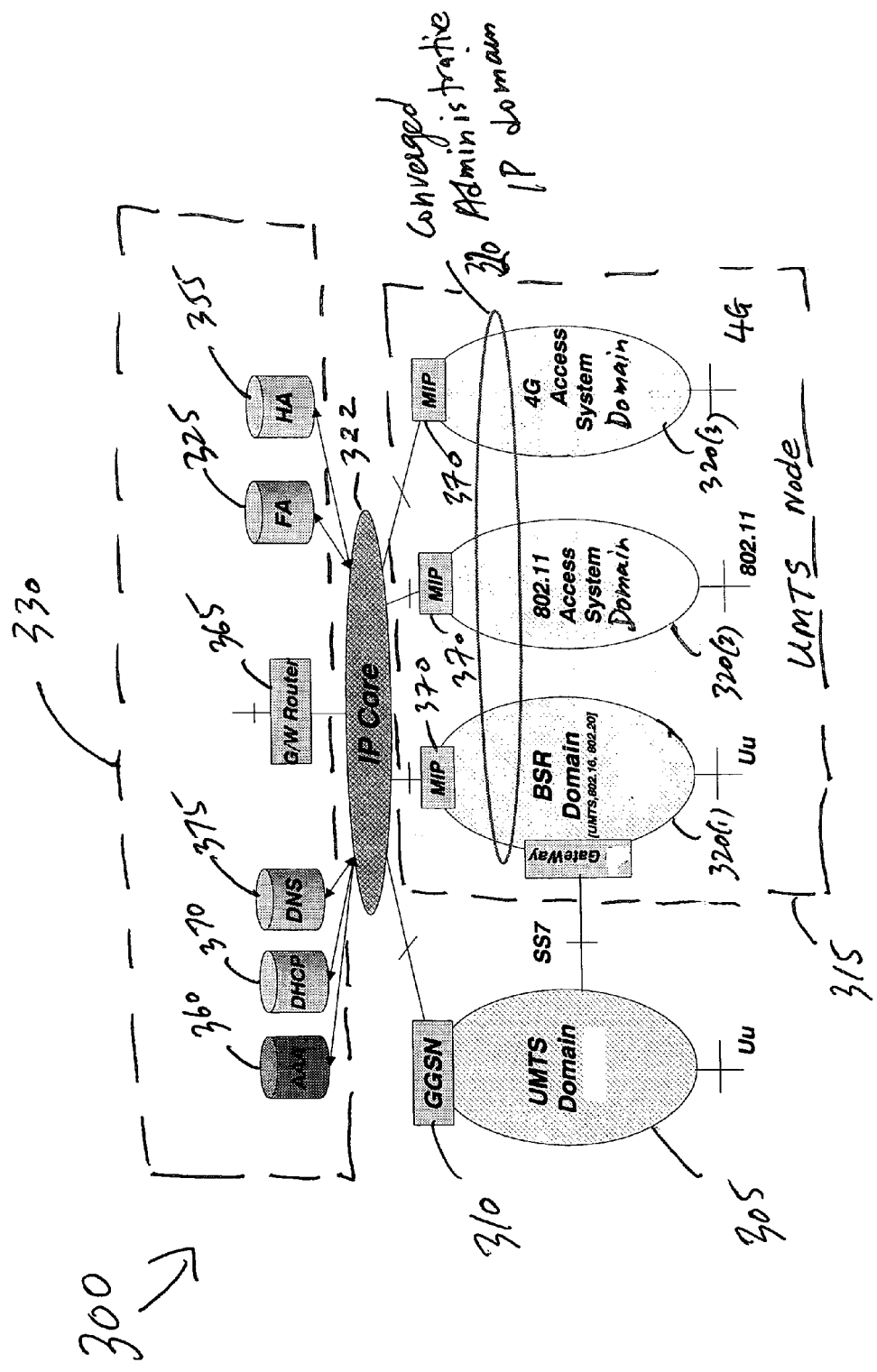
FIG. 3 schematically depicts a BSR-based wireless radio access architecture that uses an existing cellular infrastructure for providing radio access across domain-based packet networks in accordance with one embodiment of the present invention.

Referring to FIG. 3, a BSR-based wireless radio access architecture 300 is schematically illustrated to use an existing cellular infrastructure for providing radio access across domain-based packet networks in accordance with one embodiment of the present invention. Using the wireless router 105, such as a BSR shown in FIG. 1, the BSR-based wireless radio access architecture 300 may apply Internet-based Protocols (IPs) across wireless architectures. The BSR-based wireless radio access architecture 300 converges radio access for a UMTS domain 305 coupled to a GGSN 310 into a converged administrative IP domain 320. The converged administrative IP domain 320 may include a BSR domain 320(1), an IEEE 802.11 access system domain 320(2), and a fourth generation (4G) access system domain 320(3). The converged administrative IP domain 320 may be capable of interfacing with the mobile device 115, which may be implemented using disparate communication platforms, including which employ IP-based communications.

In one embodiment, the wireless router 105, for example, a BSR may form a Universal Mobile Telecommunications System (UMTS) node 315. As the UMTS node 315, in one embodiment, the BSR may substantially function as an IEEE 802.11 access point, having simplicity in deployment similar to an IEEE 802.11 access point. For providing access to the BSR domain 320(1), the wireless router 105 may be added as the UMTS node 315. An IEEE 802.11 access point may be added as an IEEE 802.11 access system domain 320(2) and to provide 4G radio access, the 4G access system domain 320(3) is added in the converged administrative IP domain 320.

For the purposes of providing IP-based wireless radio access across different domains 320(1-3), as an example, the converged administrative IP domain 320 may couple to an IP core 322 that essentially includes conventional IP routing elements 330 besides the standard network communication enabling components. In the BSR-based wireless radio access architecture 300, the IP core 322 may couple to the UMTS node 315 via a conventional mobile-IP layer 370.

While the Mobile-IP layer 370 may not assist in the user 130 movements between the domains 320(1-3), one or more IP protocols including the IETF protocols may determine routing of the user traffic 170 that may include voice and/or data and manipulate various resources of the Internet 175. The converged administrative IP domain 320 may form a seamless portion of the Internet 175 for a plurality of disparate wireless radio access architectures or systems, enabling the BSR-based wireless radio access architecture 300 to evolve with the Internet 175.

The IP elements 330 may route packets via the UMTS node 315 defined at least in part by the UMTS standard, the IEEE 802.xx standard, and 4G mobile system standard. The wireless router 105 may couple to the IP core 322, which links the mobile device 115 to the Internet 175 through a home agent (HA) 355. The IP core 322 may couple to an Authentication, Authorization and Accounting (AAA) unit 360 and a gateway (G/W) router 265. A dynamic host configuration program (DHCP) 370 and a domain name service (DNS) 375 may be associated with the IP core 322.

A network component, such as the inter-working unit 110 may control flow of mobile communications including packets within the IP-based communication system 100. To route the packets, the inter-working unit 110 may cooperate with the wireless router 105, which functions as a connection point between the domains 320(1-3) of various radio access architectures and the IP core 322. The FA 325 provides a network contact point between the mobile device 115 and the rest of the network in the IP-based communication system 100. The FA 325 may provide an endpoint for packets that are tunneled to the mobile device 115 from the Home Agent (HA) 355.

In another embodiment, the FA 325 and the HA 355 may not act in conjunction within a same network since an FA-like functionality may be provided on the wireless router or the BSR 105. In this example, the wireless router or the BSR 105 may provide a tunnel end point for traffic tunneled from the HA 355. The FA 325 may essentially perform a dual role including a.) enabling a system scaling in which BSR clusters may attach to the HA 355 whose outbound interface presents FA functionality to the routing tier above it, and b.) providing an option for those systems (not cellular wireless, such as UMTS) which do have mobile IP clients of registering with the FA-like functionality on the wireless router or the BSR 105 in the absence of the FA 325 or the client module proxy 150a on the wireless router 105.

In conjunction with the wireless router 105, the HA 355 may authenticate Mobile-IP registrations from the client module 150, as shown in FIG. 1, and may maintain current location information. The HA 255 may forward packets destined to the mobile device 115 via the wireless router 105. However, if the client module 150 is not available on the mobile device 115, using the client module proxy 150a on the wireless router 105, the IP-based communication system 100 may track network mobility to perform the Mobile IP registrations on behalf of the mobile device 115.

The AAA unit 360 may provide a remote access security that controls network access by requiring user identification and restricting access to only particular resources, and maintains records of use for billing and network audit. The AAA unit 360 may enable network security services that provide a primary framework to set up access control on the Base Station Router or access server. The G/W 365 router may provide telephony services using distributed resources for creating multimedia applications, including voice over IP (VoIP). While the DHCP 370 being a conventional protocol may assign dynamic IP address to the mobile or device 115 in the IP-based communication system 100, the DNS 375 being a conventional Internet service may translate domain names to or from IP addresses for use on the Internet 175.

In this way, the BSR-based wireless radio access architecture 300 may provide wireless radio access on analog systems through the UMTS node 315 for circuit switched voice and data across a multiplicity of radio access architectures ideally having no commonality with other architectures, in accordance with the one embodiment of the present invention. A lack of commonality across the various wireless radio access domains 320(1-3) may not increase capital outlay to an extent that may become significant to keep pace with these changes.

For the purposes of adapting a non-IETF access architecture, such as an UMTS wireless or radio access architecture to the IETF architecture of the Internet 175, the non-IETF architecture may use the wireless router 105 or a BSR as a node. That is, the wireless router 105 or a BSR may treat the UMTS cellular communications as a component part of a common system that uses IP as the commonality over at least two or ideally all the available wireless radio access architectures.

According to one illustrative embodiment of the present invention, the wireless router 105 may use the Internet Protocol based mechanism modules 190 in the converged administrative IP domain 320. The converged administrative IP domain 320 may encompass a service provider backbone IP network and an information management system (IMS). A plurality of wireless routers (WR) and a multiplicity of IP routers and an administrative edge router may support the converged administrative IP domain 320. The mobile device 115 may communicate through the converged administrative IP domain 320 over at least one of one or more wireless IP-Hops, i.e., the wireless link 132 and the packet routing path 112, as described above, in some embodiments.

Figure 4:
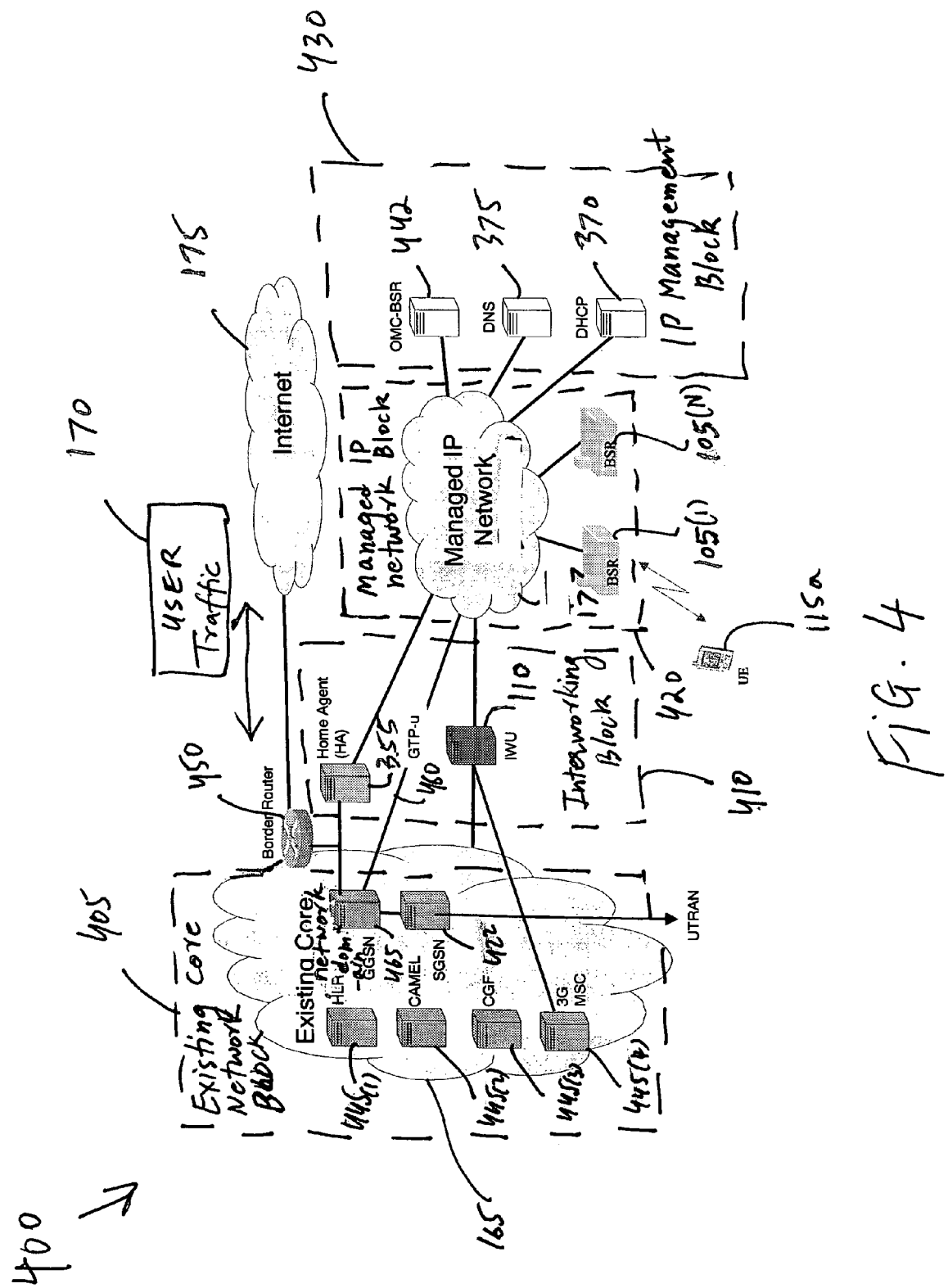
FIG. 4 schematically depicts a BSR-based inter-working architecture according to one embodiment of the present invention.

Turning now to FIG. 4, a BSR-based inter-working architecture 400 is illustrated according to one embodiment of the present invention. The BSR-based inter-working architecture 400 may comprise four blocks including an existing core network block 405, an inter-working block 410 including an inter-working unit (IWU) 110 and a Mobile-IP Home Agent (HA) 355. For providing a wireless radio access across the different domains 320(1-3) of the converged administrative IP domain 320, the BSR-based inter-working architecture 400 may further comprise a managed IP network block 420 to which a plurality of Base Station Routers (BSRs) 105 (1-N) may be coupled. To control and manage various operational attributes of the BSRs 105 (1-N), the BSR-based inter-working architecture 400 may comprise an IP management block 430, which may include the DHCP 370, the DNS 375, and a network Operations, Administration and Maintenance (OAM) module 442. The existing core network 165 of the existing core network block 405 may comprise a Home Location Register (HLR) 445(1), a Customized Applications for Mobile networks Enhanced Logic (CAMEL) 445(2), a Charging Gateway Function (CGF) 445(3) and a Mobile Switching Centre (MSC) 445(4), for example, to couple with the IWU 110 for handling the 3G system traffic.

In operation, the BSR-based inter-working architecture 400 may receive the user traffic 170. For example, the BSR-based inter-working architecture 400 may route the user traffic 170 to and from the Internet 175 via a border router 450, such as an IP router. Depending on which network the mobile device 115, such as user equipment (UE) 115a is registered, the user traffic 170 may be either routed to the existing core network block 405 via a GGSN 465 or to the managed IP network 177 for the converged administrative IP domain 320 via the home agent 355. In this way, the mobile device 115 or the UE 115a may move between the existing core network 165 and the managed IP network 177 without using a Mobile-IP client resident on the mobile device 115 or the UE 115a.

The inter-working unit (IWU) 110 may operate as a 3GPP AAA server to enable the authentication of the mobile device 115 or the UE 115a within the managed IP network 177. The inter-working unit 110 may operate as a SS7 multiplexer that acts as a point code isolator for the BSRs 105(1-N) seen by the existing core network 165. The inter-working unit 110 may operate as a GTP-C router for GPRS control traffic. In this manner, the existing core network 165 may interface with the managed IP network 177 as a "Virtual" RNC for SS7 traffic and as a "Virtual" SGSN node for GTP-C traffic, respectively.

According to one illustrative embodiment, at the inter-working block 410, the BSR-based inter-working architecture 400 may include a GTP-U link 460 between the managed IP network 177 and the GGSN 465 of the existing core network 165. The GTP-U link 460 may enable flow of traffic between the two networks 165, 177 if the mobile device 115 or the UE 115a is unable to move the GTP anchor point. If the mobile device 115 or the UE 115a may be able move the GTP anchor point, the Mobile-IP Home Agent 355 may handle the data and subsequent data mobility information. The GGSN 465 of the existing core network 165 may couple to a SGSN 422 to interface with a UMTS Terrestrial Radio Access Network (UTRAN).

At the managed IP network block 420, the plurality of BSRs 105(1-N) may represent as care-of-addresses to the mobile device 115 or the UE 115a. The mobility within the managed IP network 177 may indicate a combination of existing Mobile-IP and enhanced UTRAN layer 2 mobility. However, no changes to mobility may be perceived by the mobile device 115 since the mobility related enhancements may be handled by a BSR 105 as well as communications between the BSRs 105(1-N).

Using the BSRs 105(1-N), the managed IP network 177 may move originating and terminating circuit switched calls back to the existing core network 165. For example, to move such calls back to the existing core network 165, the BSR-based inter-working architecture 400 may use a directed retry technique. To handle the switched calls, in on embodiment, the BSR-based inter-working architecture 400 may use SS7 signaling through the inter-working unit (IWU) 110. In this way, the managed IP network 177 may not handle circuit switched user plane traffic. However, the managed IP network 177 may handle voice traffic as Voice over IP (VoIP).

In some embodiments of the present invention, the BSR-based inter-working architecture 400 may enable the BSRs 105(1-N) or a stand alone IETF based system to inter-work to another system including a third generation (3G) system, such as a UMTS-based wireless communications system. The BSR-based inter-working architecture 400 may enable a desired evolution path to an IETF (e.g., all IP based) system that may allow a relatively easier addition of newer IEEE or 4G based air interfaces. The BSR-based inter-working architecture 400 may enable a desired management of mobility among several disparate wireless communications systems, such as the cellular or wireless data networks in an efficient way. The BSR-based inter-working architecture 400 may enable a greater flexibility in a 3GPP-based architecture and provide for a smoother evolution to next generation interfaces beyond UMTS and CDMA2000. Since the BSRs 105(1-N) may comply with desired common IETF-based networks, the BSR-based inter-working architecture 400 may provide inter-working to non-IETF protocol based networks. Consequently, the BSR-based inter-working architecture 400 may enable a smoother evolutionary path of such networks to IETF all-IP based networks.

The existing core network 165 may interface with the border router 450, such as an Internet protocol-based router associated with the fixed, wired network portion of a packet-based access network. For example, the border router 450 may be an ATM-based router that integrates an IEEE 802.xx based wireless Ethernet access point and a $^{10}\!/_{100}$Base-T Ethernet switching hub.

The mobile device 115, for example, the user equipment (UE) 115a may comprise a conventional transceiver coupled to a controller, in turn, coupled to a storage storing instructions, such as the client module 150 to communicate with the converged administrative IP domain 320. The UE 115a may take the form of any of a variety of devices, such as mobile terminals including cellular phones, personal digital assistants (PDAs), laptop computers, digital pagers, wireless cards, and any other device capable of accessing the converged administrative IP domain 320.

In one embodiment, the BSRs 105(1-N) may combine fixed, wired and wireless link characteristics and leverage given protocol mechanism, i.e., the Internet Protocol. Specifically, the Internet protocol may be used for a packet-switched communication as a network layer protocol for interconnecting systems, which may support voice and video transmission along with data communications.

Examples of the Internet Protocol include a version four of the Internet Protocol (IPv4) and a version six (IPv6). The IPv4 uses 32-bit unique addresses that can be allocated as public Internet addresses and is described in IETF RFC 791, published in September, 1981. The IPv6 uses 128-bit address to support up to about $3.4 \times 10^{38}$ public Internet addresses. To assist with router processing, the IPv6 packets include a label that provides a Quality of Service (QoS) indication for priority applications, such as real-time video and voice. The 128-bit address space of the IPv6 may support many types of devices such as telephones, automobiles, and the like when forming connections on the Internet using a flow ID in a packet header to identify flows.

The BSRs 105(1-N) may use a variety of identification schemes to resolve IP addresses for the purposes of routing packets in the BSR-based inter-working architecture 400 that includes the managed IP network 177. The managed IP network may comprise logical layers from application to physical layers for network elements to meet the QoS metric 135 associated with an end-to-end service for the user traffic 170.

The BSRs 105(1-N) may extend QoS models to the cellular network 120 arena from the managed IP network 177, maintaining the QoS metric 135 of multimedia traffic, such as the user traffic 170. Using an Internet Protocol, one or more services including a telecommunication service in multiple broadband, Quality of Service (QoS)-enabled transport channels may be provided on the BSR-based inter-working architecture 400.

The BSR-based inter-working architecture 400 may use a first broadband signal over a first channel to carry a first multimedia content including voice, video or data and a second broadband signal over a second channel having independent bandwidth than used for the first channel to carry a second multimedia content including voice, video or data. At least two Quality of Service (QoS)-enabled transport strategies may be provided for each of the different first and second channels. In this way, the plurality of packets may be communicated in real-time within a multimedia traffic stream between the mobile device 115 and the cellular network 120 and/or the wireless data network 125.

Figure 5:
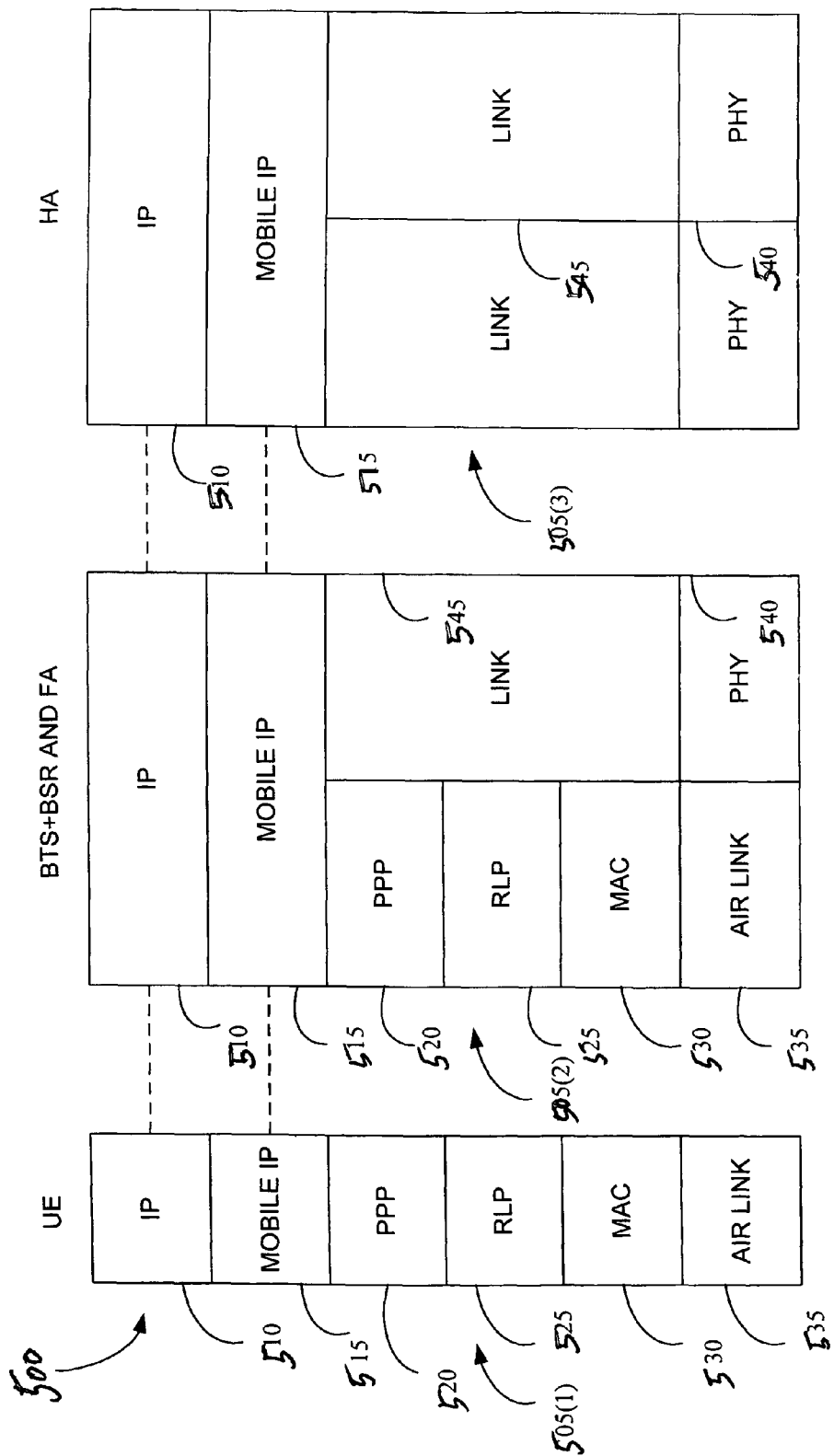
FIG. 5 illustrates an exemplary protocol stack for the wireless router, such as a base station router that uses the inter-working unit shown in FIG. 1 to provide radio access in accordance with one embodiment of the present invention.

Referring to FIG. 5, an exemplary protocol stack 500 is illustrated for the wireless router 105, such as a base station router that uses the inter-working unit 110 to provide radio access in accordance with one embodiment of the present invention. A protocol stack 505(1) is shown for the mobile device 115, such as the UE 115a. In addition, a protocol stack 505(2) is shown for the wireless router 105 that includes the BTS circuitry, a BSR card which includes the FA 325. Likewise, the HA 355 may have an associated protocol stack 505(3). The network layer in these three protocol stacks 505(1-3) may include an Internet Protocol (IP) layer 510 and a mobile IP layer 515.

The protocol stacks 505(1-2) may further comprise a Point-to-Point Protocol (PPP) layer 520, which provides a communications protocol that turns a dial-up telephone connection into a point-to-point Internet connection used to run world wide web (WWW) browsers over a phone line. Another layer common to the protocol stacks 505(1-2) may be Radio Link Protocol (RLP) layer 525, which is a protocol used over the interface.

A Medium Access Control (MAC) layer 530 may be also be shared across the protocol stacks 505(1-2). The MAC layer 530 may provide a networking protocol to handle transmission requests, authentication and other overheads in local area networking by being a portion of a data link layer that controls access to a communication channel. The MAC layer 530 is specified in the IEEE 802.xx standard for medium sharing, packets formats and addressing, and error detection. Of course, a multiplicity of other standards may define a MAC protocol, e.g., 3GPP, and 3GPP2. Accordingly, one or more MAC protocols may be selected based on availability (of the air interface access type) and a primacy of connection, which may be the preferred (default) access type. An air link layer 535 may specify a forward radio frequency (RF) channel directed from the converged administrative IP domain 320 to the mobile device 115 a reverse RF channel directed from the wireless communication device 115 to the converged, administrative IP domain 320 as shown in FIG. 3.

The protocol stacks 505(2-3) may comprise a physical (PHY) layer 540; the lowest layer in a network communication model for wireless networking may define use of signal modulation and RF transmission. The PHY layer 540 corresponds to a radio front end and baseband signal processing section and may define parameters, such as data rates, modulation, signaling, transmitter/receiver synchronization, and the like. In the case of wireless communications, the PHY layer 540 defines a transport medium, i.e., communication interface. A link layer 545 of the protocol stacks 505(2-3) may form packets from data sent by higher-level layers and pass these packets down to the PHY layer 540. Use of the protocol stacks 505(1-3) may enable the wireless router 105, i.e., the BSR to be IP-protocol compatible.

Although the Internet Protocol (IP)-based communication system 100 is based on a UMTS protocol, a CDMA2000 protocol based stack 500 is illustrated for the wireless router 105 in FIG. 5 as an example. In the IP-based communication system 100, a 3GPP Packet Data Convergence Protocol (PDCP) may supply IP header compression services across an air interface. As shown, the Point-to-Point Protocol (PPP) layer 520 may supply IP header compression services in the CDMA2000 protocol example. Moreover, in the UMTS protocol based IP-based communication system 100 a Radio Link Control (RLC) layer may be used instead of the RLP layer 525.

Figure 6:
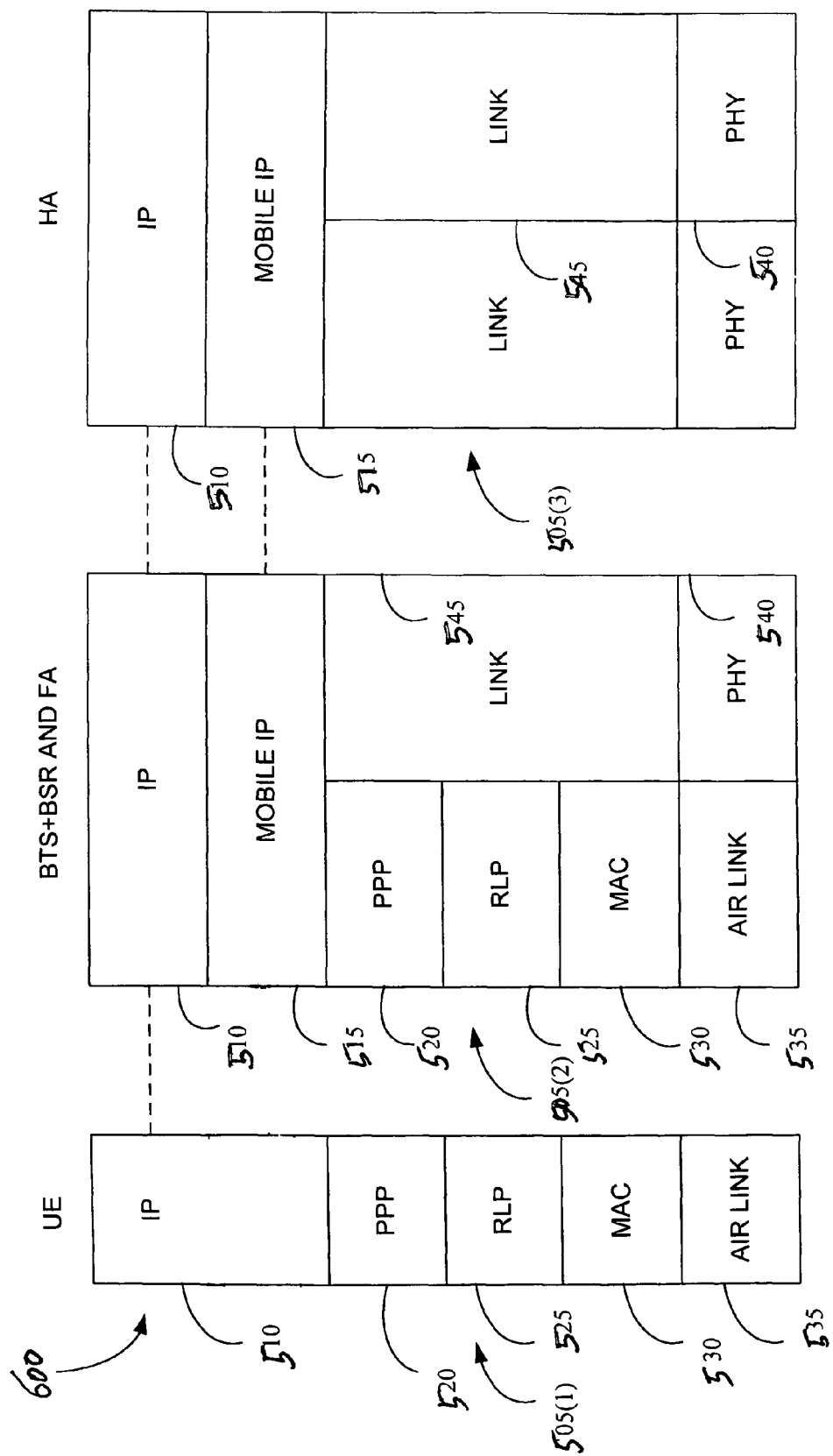
FIG. 6 illustrates another exemplary protocol stack for the wireless router, such as a base station router that uses the inter-working unit shown in FIG. 1 to provide radio access in accordance with one embodiment of the present invention.

Referring to FIG. 6, another exemplary protocol stack 600 is illustrated for the wireless router 105, such as a base station router that uses the inter-working unit 110 to provide radio access in accordance with one embodiment of the present invention. The protocol stack 600 does not include the Mobile IP layer 515 on the UE 115a The BTS+BSR and FA terminate the Mobile IP layer 515. However, irrespective of the client module 150 having the capability for supporting Mobile IP, using the client module proxy 150a at the wireless router or the BSR 105 shown in FIG. 1, the IP-based communication system 100 may provide seamless mobility across heterogeneous access types.

By supporting heterogeneous traffic seamlessly over a radio access system, a system-wide resource management may be enabled for disparate wireless access techniques. Heterogeneous traffic may be supported seamlessly over a radio access system for disparate wireless access techniques. Such resource management may allow extension of an existing or integration of a new communication interface without impacting on overall system architecture and protocols.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention set forth above is described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

While the invention has been illustrated herein as being useful in a telecommunications network environment, it also has application in other connected environments. For example, two or more of the devices described above may be coupled together via device-to-device connections, such as by hard cabling, radio frequency signals (e.g., 802.11(a), 802.11(b), 802.11(g), Bluetooth, or the like), infrared coupling, telephone lines and modems, or the like. The present invention may have application in any environment where two or more users are interconnected and capable of communicating with one another.

Those skilled in the art will appreciate that the various system layers, routines, or modules illustrated in the various embodiments herein may be executable control units. The control units may include a microprocessor, a microcontroller, a digital signal processor, a processor card (including one or more microprocessors or controllers), or other control or computing devices as well as executable instructions contained within one or more storage devices. The storage devices may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions, when executed by a respective control unit, causes the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

We claim:

1. A method for providing radio access to a cellular network and an Internet Protocol-based wireless data network in a distributed communication system, the method comprising:

setting up a packet routing path using a base station router that provides access to said cellular network and said wireless data network, wherein the packet routing path is provided via an interworking unit between said cellular and wireless data networks to provide a quality of service metric and an indication for mobility information associated with a mobile device so that the mobile device can access either the cellular network or the wireless data network using the base station router, and wherein the base station router implements a protocol stack supporting physical layer, link layer, and network layer functionality; and in response to a service request from the mobile device, transferring said quality of service metric and said indication for mobility information on said packet routing path and—using the base station router to cause said mobile device to transition between accessing said cellular network via the base station router and accessing said wireless data network via the base station router.

2. A method, as set forth in claim 1, further comprising:
deploying an existing core network for said cellular network; and
deploying a managed network based on an Internet Protocol for said Internet Protocol-based wireless data network.

3. A method, as set forth in claim 2, further comprising:
using the a client module proxy to cause said mobile device to transition between said existing core network and said managed network without using a client associated with said mobile device to provide a Mobile-IP layer support on said mobile device.

4. A method, as set forth in claim 3, further comprising:
causing said mobile device to transition between said existing core network and said managed network without using the client that provides the Mobile-IP layer support on said mobile device.

5. A method, as set forth in claim 4, further comprising:
using the base station router to manage said managed network;
enabling authentication of said mobile device within said managed network; and
enabling said existing core network to recognize said managed network as a virtual radio network controller for traffic associated with session management and recognize said managed network as a virtual serving general packet radio service support node for traffic associated with general packet radio service tunneling protocol of control.

6. A method, as set forth in claim 4, further comprising:
enabling said managed network to move at least one of an originating and a terminating circuit switched calls back to said existing core network.

7. A method, as set forth in claim 4, further comprising:
handling circuit switched user plane traffic within said existing core network.

8. A method, as set forth in claim 4, further comprising:
handling voice traffic as Voice over IP in said managed network.

9. A method, as set forth in claim 4, further comprising:
providing a link for a general packet radio service tunneling protocol of said mobile device between said managed network and said existing core network to enable data traffic therebetween for said mobile device when unable to move an anchor point associated with said general packet radio service tunneling protocol.

10. A method, as set forth in claim 1, further comprising:
deploying a radio access module for said cellular and wireless data networks, said radio access module having a portion common to said cellular and wireless data networks for use by a network operator that operates said cellular and wireless data networks.

11. A method, as set forth in claim 10, further comprising:
in response to said service request, determining whether said user subscribes to an associated service with said cellular and wireless data networks through a same service provider; and
if so, causing said network operator to use said portion common to said cellular and wireless data networks to serve said service request.

12. A method, as set forth in claim 1, wherein said cellular and wireless data networks are heterogeneous cellular networks and are capable of providing wireless communications over said Internet Protocol-based communication system.

13. A method, as set forth in claim 1, further comprising:
receiving user traffic at the base station router deployed at a border of an existing core network associated with said cellular network.

14. A method, as set forth in claim 13, further comprising:
causing said wireless data network to inter-work with said cellular network via the interworking unit for a network operator.

15. A method, as set forth in claim 14, further comprising:
conveying said user traffic associated with said service request across said cellular and wireless data networks using said packet routing path between said cellular and wireless data networks.

16. A method, as set forth in claim 1, further comprising:
setting up said packet routing path between said cellular and wireless data networks to integrate radio access fur said service request between said cellular and wireless data networks.

17. A method, as set forth in claim 16, further comprising:
using said wireless data network to extend a service area of said cellular network based on said radio access for a network operator within said Internet Protocol-based communication system.

18. A method, as set forth in claim 1, wherein said indication for mobility information includes mobility context information.

19. A method, as set forth in claim 1, wherein said cellular network is at least in part based on a Universal Mobile Telecommunications System standard.

20. A method, as set forth in claim 1, wherein said wireless data network is at least in part based on at least one of an Internet Engineering Task Force and an Institute of Electrical and Electronics Engineers standard.

21. A method, as set forth in claim 1, wherein enabling the packet routing path via the base station router comprises enabling the packet routing path via a base station router that includes both user plane and control plane protocol stacks.

22. A method, as set forth in claim 1, wherein enabling the packet routing path via the base station router comprises enabling the packet routing path via a base station router that forms a portion of at least one of a virtual radio network controller or a virtual serving general packet radio service node.

* * * * *